(12) United States Patent
Clemmons et al.

(10) Patent No.: US 6,484,765 B1
(45) Date of Patent: Nov. 26, 2002

(54) FAST FLOWING SPRING LOADED VALVE ASSEMBLY

(75) Inventors: Kody Clemmons, 815 Arkansas Ave., Lynn Haven, FL (US) 32444; Everett B. James, Jr., Panama City, FL (US)

(73) Assignee: Kody Clemmons, Lynn Haven, FL (US)

(*) Notice: Subject to any disclaimer, the term of this patent is extended or adjusted under 35 U.S.C. 154(b) by 63 days.

(21) Appl. No.: 09/737,693

(22) Filed: Dec. 18, 2000

(51) Int. Cl.[7] .................................................. B65B 3/00
(52) U.S. Cl. ........................ 141/292; 141/291; 141/308; 141/352; 141/353
(58) Field of Search ................................ 141/291, 292, 141/295, 308, 351–354; 222/481, 481.5

(56) References Cited

U.S. PATENT DOCUMENTS

| | | | | |
|---|---|---|---|---|
| 738,622 A | * | 9/1903 | Miller | 141/291 |
| 824,095 A | * | 6/1906 | Cooke | 141/295 |
| 966,270 A | * | 8/1910 | Van Leir | 141/354 |
| 2,929,417 A | * | 3/1960 | Mosher | 141/292 |
| 3,653,416 A | * | 4/1972 | Hocq | 141/353 |
| 4,667,710 A | * | 5/1987 | Wu | 141/292 |
| 5,224,528 A | * | 7/1993 | Helmut et al. | 141/353 |
| 5,234,038 A | * | 8/1993 | Mitchell et al. | 141/291 |
| 5,704,408 A | * | 1/1998 | Law | 141/292 |

* cited by examiner

Primary Examiner—J. Casimer Jacyna
(74) Attorney, Agent, or Firm—William B. Noll

(57) ABSTRACT

An automatic shut-off valve assembly having particular utility in a portable container of the type for dispensing fluid, such as fuel into a vehicle gas tank, where speed, safety and convenience are prime requirements. The valve assembly includes a spring biasing mechanism to effect opening and closing of the valve assembly. The assembly further includes a generally circular, hollow housing containing a slidably movable insert, which receives the spring, where the spring effects an automatic closing of the assembly, but yields upon the application of axial pressure to open the assembly.

12 Claims, 5 Drawing Sheets

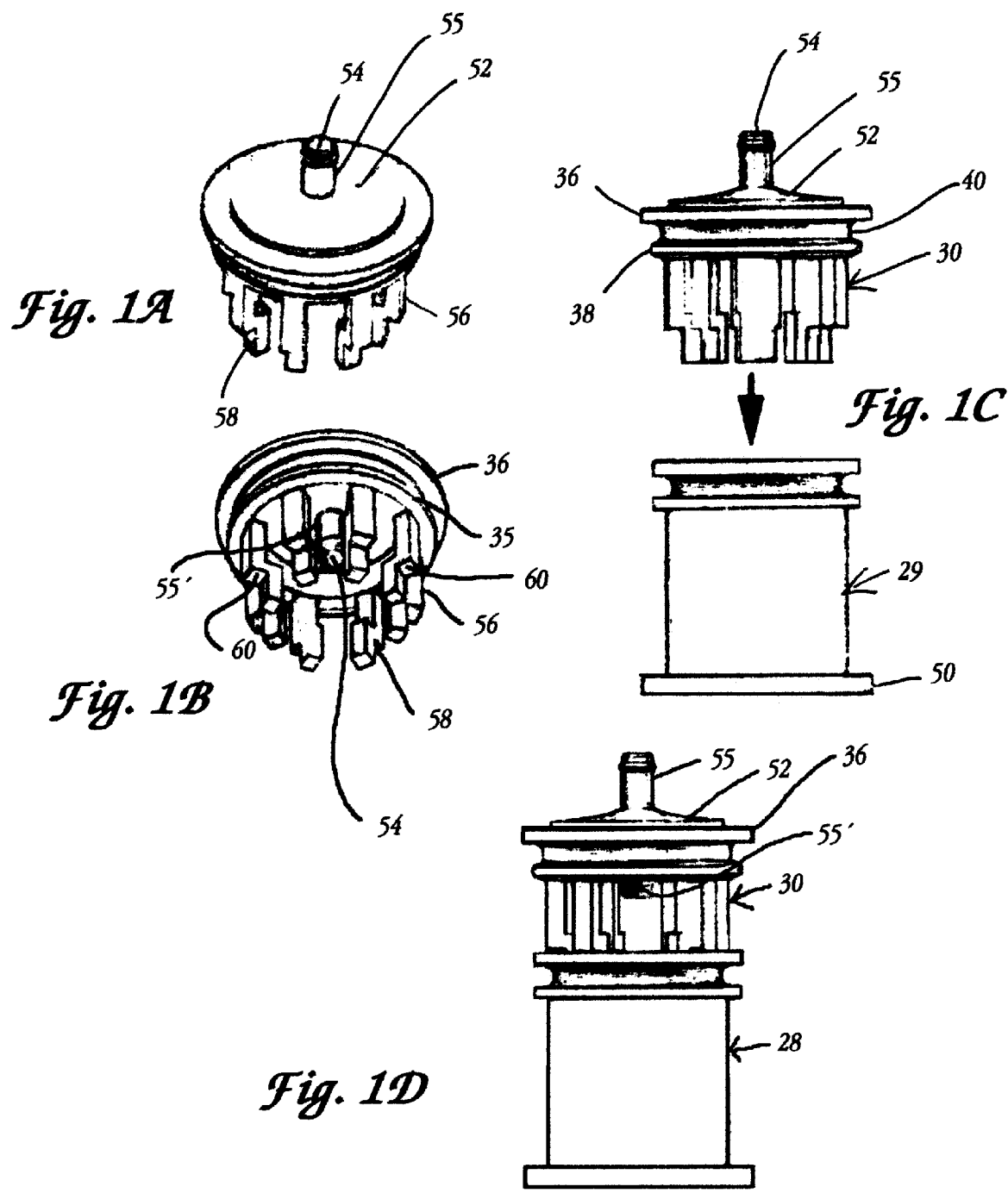

FAST FLOWING SPRING LOADED VALVE ASSEMBLY

RELATED APPLICATION

This application is related to Ser. No. 09/595,008, filed Jun. 16, 2000, under the title, "Fuel Dispensing System", by one of the co-inventors hereof, now U.S. Pat. No. 6,276,571, issued Aug. 21, 2001, where the respective applications are directed to portable fluid dispensing systems, such as fuel dispensing apparatus.

FIELD OF THE INVENTION

The present invention is directed to an improved valve assembly for use in a portable fluid dispensing system, particularly of the type for quickly dispensing fuel to a road, track, or off-road vehicle.

BACKGROUND OF THE INVENTION

This invention relates to an improved, fast flowing, spring loaded valve assembly, having particular utility as the dispensing mechanism for a portable system for the transfer of fuel, for example, to a vehicle's fuel tank. Transferring fuel from a portable container to a vehicle fuel tank can often result in spillage and the potential of fire where the engine is hot and in close proximity to the fuel tank. Add to this the desire and need for a rapid transfer, such as in racing cars and 4-wheelers, or quads, conventional portable containers offer neither the speed nor safety required in the transfer process.

The prior art, in its recognition for the need for safety in transferring fuel from one location to another, has devised a number of complex schemes to effectively make such transfer. Such complex schemes are reflected in the following U.S. Patents:

a.) U.S. Pat. No. 4,441,533, to Snyder, et al., teaches an automatic fuel dispensing system including an automatic dispensing nozzle similar to dispensing nozzles which open manually to dispense liquids and shut-off automatically when tanks such as locomotive fuel tanks near the point of being filled, or for closing an automatic shut-off valve when the dispensing valve is a substantial distance from the tank being filled. The automatic dispensing system is provided with an atmospheric pressure balanced diaphragm and an internal vacuum conduit where the diaphragm operates the shut-off valve when reduced air pressure from the vacuum conduit interrupts the pressure balance of the diaphragm. The tank to be filled is provided with an air conduit connected to the internal vacuum conduit of the automatic dispensing nozzle to operate the cut-off of the nozzle to a point adjacent the outer opening of the tank fill pipe when fuel enters the air conduit. Mounted in the fill pipe of the tank is a fill pipe adapter which cooperates with the nozzle spout of the automatic dispensing nozzle to create a vacuum chamber between the inserted nozzle spout and the adapter wall. To satisfy the vacuum demand of the automatic shut-off valve, the nozzle spout extends into the fill pipe adapter a sufficient distance to provide a narrow opening between the end of the spout and the adapter wall such that when liquid is dispensed from the nozzle spout, air is removed from the vacuum chamber creating a partial vacuum for operating the shut-off valve.

b.) U.S. Pat. No. 5,343,738, to Skaggs, relates to a double walled hose assembly including an elongate inner hose and an elongate outer hose enclosing the inner hose. Both the inner and outer hoses are flexible and made of a resilient material. The inner hose includes a fluid resistant inner layer, a tie layer encircling the inner layer and a reinforcing braid layer encircling the tie layer. An outer layer encircles the tie layer and the reinforcing braid such that the reinforcing braid is embedded between the tie layer and the outer layer. The outer hose is also made from a resilient material such that the outer hose is flexible. At least one rib extends between the inner hose and the outer hose. The at least one rib is secured to at least one of the inner hose and the outer hose and is made from a resilient material such that the rib is flexible. In this way, the hose assembly can be bent as necessary. The hose serves as a fluid transfer hose in a piping system for conveying a fluid from an outlet port of a pump to an inlet port of an above-ground fluid dispenser. A sensor wire may be provided between the two hoses to sense the presence of a fluid such as a fuel.

c.) U.S. Pat. No. 5,609,192, to Anderson, et al., is a fuel dispensing nozzle and a method utilizing that dispensing nozzle. The method comprises the steps of providing a sealing means effective to mate in a sealing relationship with a fuel tank inlet, the sealing means comprising a boot having an elastomeric sealing surface, a source of pressurized gas, a channel providing communication from the source of pressurized gas to outside of the boot wherein pressure on the elastomeric sealing surface restricts flow through the channel, and a means to block fuel flow through the fuel dispensing nozzle when a threshold pressure or greater exist at the source of gas supply, the threshold pressure indicative of a sealing relationship between the sealing surface of the boot and a fuel tank inlet, mating the sealing surface to the fuel tank inlet: and passing fuel into the fuel tank only when the pressure within the gas supply conduit exceeds the threshold pressure.

d.) U.S. Pat. No. 5,971,042, to Hartsell, Jr. teaches a fuel dispenser for a dispensing system having a receiver capable of receiving fueling parameters transmitted from the vehicle. The fueling parameters relate to information about tank size, ullage, maximum allowed fueling rates and maximum fueling rates as a function of ullage, among others. Based on these fueling parameters, the fuel dispenser controls the fueling operation to optimize fuel delivery and minimize fuel spillage. Control of the fileing operation may vary from simply adjusting the delivery rate to a maximum allowed by the vehicle to defining a fueling schedule for the entire fueling operation wherein the fueling schedule defines a fueling process which varies flow rates throughout the fueling operation as necessary to optimize fueling. Additionally, the dispenser may continuously adjust the maximum fueling rate throughout the fueling operation based upon a fueling parameter defining the maximum fueling rate as a function of ullage. The dispenser may also control the fueling operation based on fueling parameters received from the vehicle in combination with fueling regulations mandated by various regulatory bodies. In such embodiments, the dispenser may optimize the fueling operation while abiding by both vehicular and regulatory limitations, such as maximum allowable delivery rates and predefined average fuel rates for all or various portions of the fueling operation.

There is clearly a need for safety and convenience in the transfer of fuels, and when coupled with a rapid transfer, the concerns are compounded, particularly in a portable device. The above prior art offers no help in achieving such goals. However, the present invention provides an effective system that is convenient, safe and speedy. The manner by which the invention hereof meets such needs will become apparent in the description which follows.

SUMMARY OF THE INVENTION

This invention is directed to an improved, spring biased valve assembly for use in a portable container for transporting a fluid, such as a liquid fuel, and for rapidly and safely transferring said fuel into a receptacle, i.e. gas tank. The container, as known in the art, comprises a closed fluid containing chamber with a top wall, bottom wall, and side walls extending therebetween. Additionally, there are means available for filling the container and for dispensing the fluid from the chamber. Associated with the means for dispensing the fluid, i.e. fuel, is an improved valve assembly to ensure a rapid and safe transfer. The valve assembly comprises a generally circular hollow housing open at its respective ends, where the ends have a uniform diameter and the mid section is enlarged, such as ball configured. Within a first of the end sections is an axially slidable insert, preferably formed of two matable members, in fluid sealing engagement with the first end section. The insert is normally held in a closed or fluid transporting position by a coil spring. Included as part of the insert is an annular base, against which the coil spring acts, where the diameter of the annular base is greater than the diameter of the first end section of the housing. By this arrangement the annular base abuts against the enlarged mid section at the junction between the mid section and the first end section, thus closing off any fluid flow from the container. To dispense fluid from the container, a normal or axial pressure on the insert will cause it to depress against the action of the coil spring to open the valve assembly and allow a rapid and safe flow of the fluid into the desired receptacle or gas tank. In a preferred assembly, the valve assembly further includes a flexible bellows member to effect axial movement of the insert, while maintaining a fluid and gas seal with the tank or receptacle to which the fluid is being transferred. Another feature of the valve assembly is the provision of an air return line to transfer air to or from the tank or receptacle, thus placing the dispensing container in a hermetically sealed relationship to the tank or receptacle.

Accordingly, an object of the invention is to provide a valve assembly that can be easily operated to control the fluid flow from a container in which the valve assembly is mounted.

Another object hereof lies in the use of a compression coil spring that provides an immediate shut off when pressure is removed from the valve assembly.

A further object of the invention lies in the use of a circular housing containing a sliding insert movable from a first, fluid flowing position, to a second, non-fluid flowing position.

Still another object hereof is the provision of a flexible bellows to ensure a sealing relationship during transfer of the fluid to a tank or receptacle.

Finally, another object of this invention lies in the use of a contained air transfer tube that allows air to pass to or from the fluid dispensing container and the fluid receiving receptacle.

These and other objects will become apparent from the description which follows, particularly when read in conjunction with the accompanying drawings.

BRIEF DESCRIPTION OF DRAWINGS

FIGS. 1A and 1B are top and bottom perspective views, respectively, of a valve component for the mechanism hereof.

FIG. 1C is an exploded side view of the valve component of FIGS. 1A and 1B prior to its insertion into a circular housing, where the respective components are sonically welded to one another in the valve mechanism of this invention.

FIG. 1D is a side view of the components of FIG. 1C.

DETAILED DESCRIPTION OF PREFERRED EMBODIMENT

The present invention relates to an improved, self terminating valve assembly to control fluid flow, where the valve assembly has particular utility as a functioning component in portable containers of the type for dispensing fluids, such as fuel into the gas tank of a vehicle. A preferred container is described and illustrated in said co-pending application, where the contents thereof are incorporated herein by reference.

The improved valve assembly will now be described with regard to its preferred use, however, it should be understood that other applications for the valve assembly may be present, and that such other applications are contemplated herein.

Figure 1:
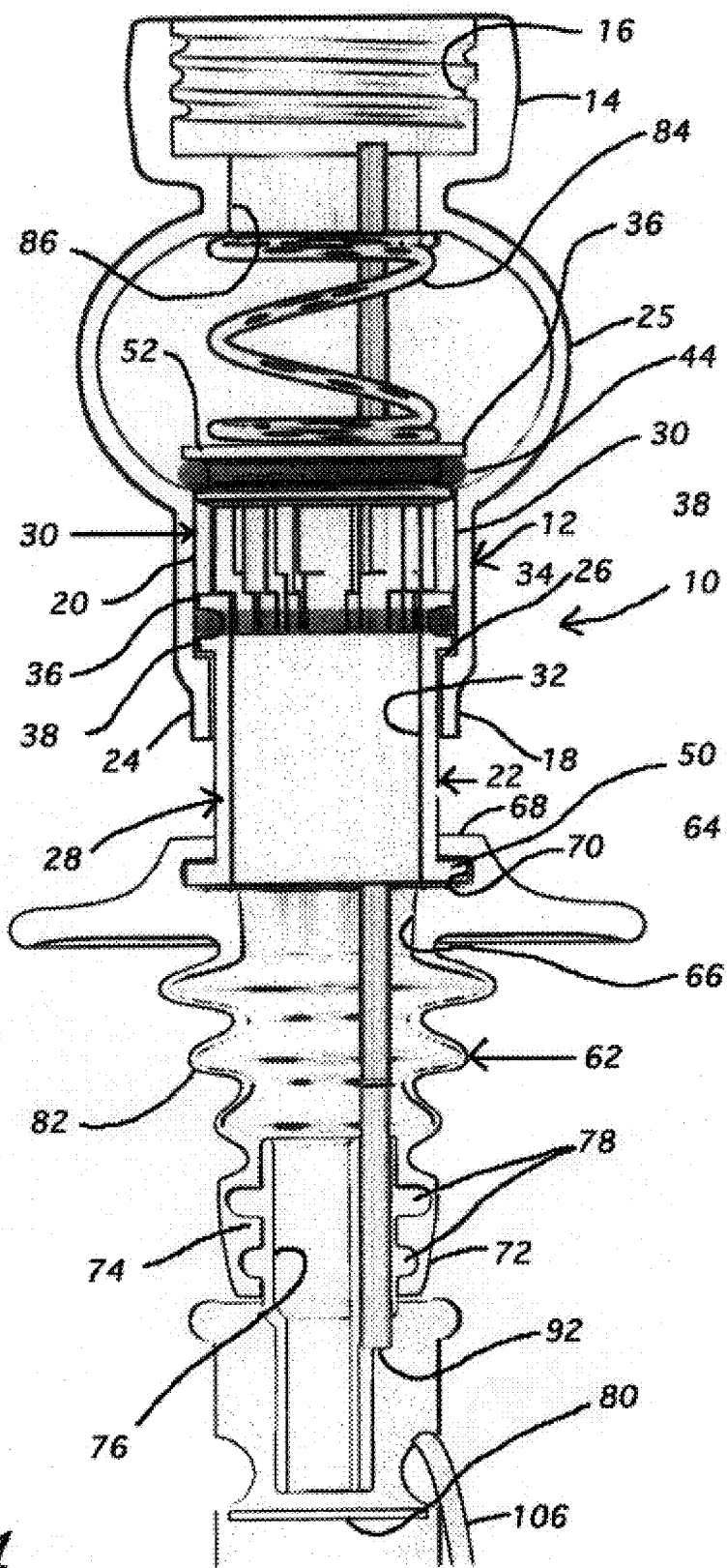
FIG. 1 is a sectional view of the preferred valve mechanism of this invention, showing the mechanism in a pre-operational mode.
Figure 4:
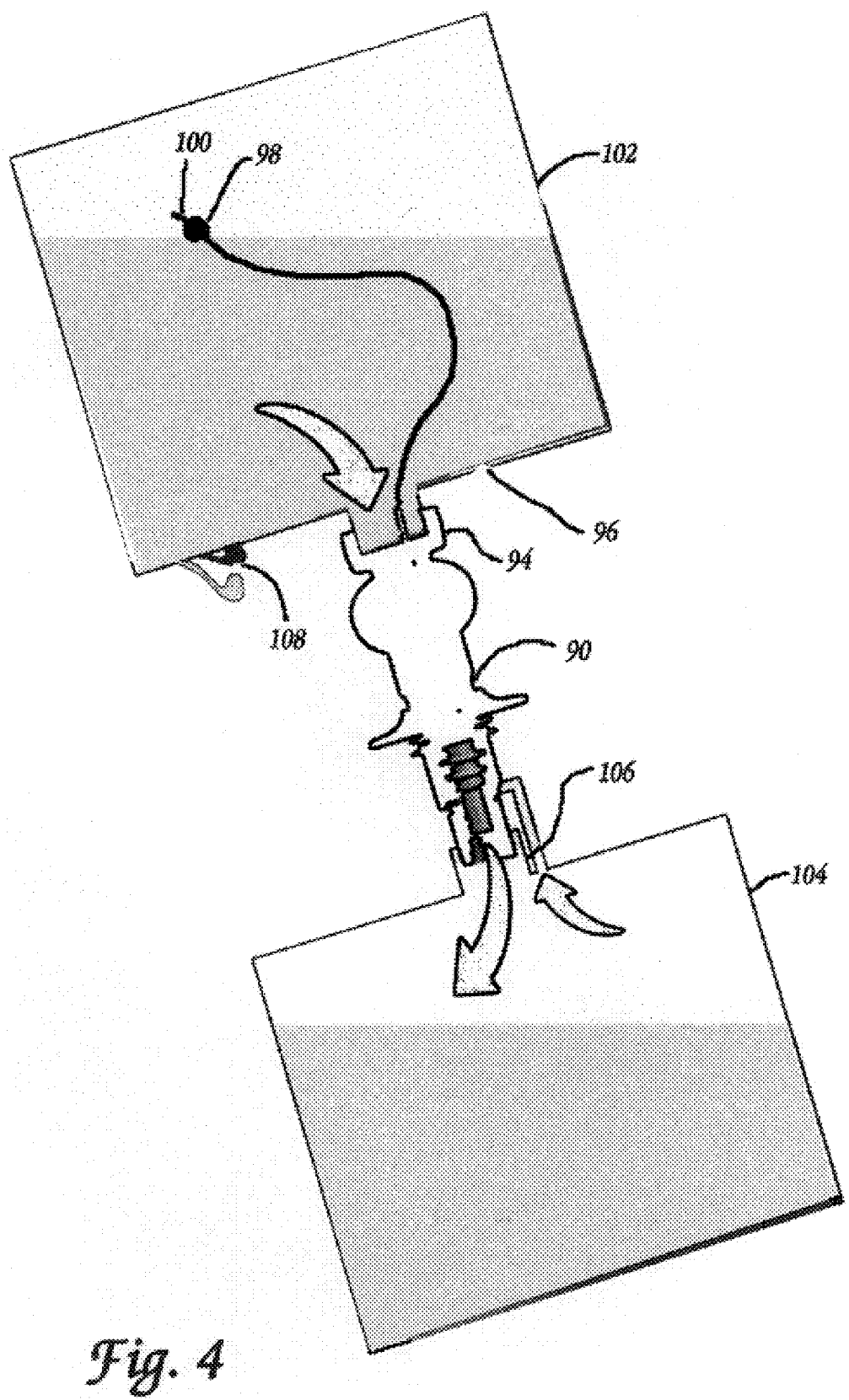
FIG. 4 is a simplified sectional view of the valve mechanism of this invention, showing the valve mechanism secured to a portable, fluid containing receptacle, and dispensing the fluid from the receptacle into a tank, for example.

Turning now to the several Figures, where like reference numerals represent like components or features throughout the various views, FIG. 1 illustrates the improved valve assembly 10 which comprises an open housing 12, fabricated preferably of plastic and assembled in two mating halves, with a first end 14 internally threaded 16 for engaging a container, with complementary external threads, of fluid for dispensing, see FIG. 4. The opposite end 18 has a uniform diameter portion 20, for slidable receiving an insert 22 (see FIGS. 1A through 1D), and a reduced diameter portion 24 characterized by an inwardly directed, annular flange 26 which functions as a stop for the sliding insert 22. Intermediate the ends 14, 18, the housing is characterized by a broadened portion 25.

The insert 22 comprises a cylindrical member 28 and cage member 30, see FIGS. 1A through 1D. The cylindrical member 28 includes a through opening 32, and an upper end 34 with a pair of spaced apart annular ribs, an upper rib 36 of a predetermined diameter, and a second rib 38, each of a diameter to be slidable received within the uniform diameter portion 20. Between the respective annular ribs is a groove 40 for receiving an O-ring 44 to provide a sealing engagement with the wall of uniform diameter portion 20. The lower end of the cylindrical member 28 includes an external, annular flange 50, the function of which will become apparent hereafter.

Sonically welded to the cylindrical member 28 is the cage member 30, see FIGS. 1, 1A through 1D. The latter Figures illustrate the design features of the cage member 30. The cage member comprises a cap portion 52 having a central opening 54 with a pair of axially extending through rings 55, 55' for attaching air return tubes as later discussed. Further, the cage member 30 includes plural downwardly directed, radial arms 56 extending from the cap portion 52. The radial arms 56 have a lower stepped portion 58 and shoulder 60, where the respective stepped portions define a diameter coextensive with the uniform diameter portion 20. When assembled, see FIG. 1, the stepped portions 58 slidably engage the uniform diameter portion, up to the shoulder 60, where it may be sonically welded thereto to form an integral unit.

The lower mechanism of the valve assembly 10 is a generally circular bellows member 62, formed of an elastomeric material, having a broadened upper cap portion 64 with a central opening 66. The opening features an internally directed flange 68 overlying an internal groove 70 for snap engaging the annular flange 50 of the cylindrical member 28. The lower end 72 comprises a lower cylindrical end 74 with a cylindrical insert 76, where the insert may include a pair of annular ribs 78 for snap engaging within the cylindrical end 74. The cylindrical insert 76, preferably of a hardened material, such as plastic, is intended to engage and depress a pivotal valve 80, as may be found in gas tanks, for example, that is intended to minimize vapor release to the atmosphere, see FIGS. 2 and 3. Between the broadened cap portion 64 and lower end 74 is a flexible, thin walled portion 82 that compresses when axial pressure is applied to the valve assembly 10. By the presence of the different diametric portions, one should be sufficient to engage a variety of sizes for the fluid receiving opening of a given receptacle receiving the dispensed fluid. By this arrangement, and the use of an internal air transfer tube, as later defined, a hermetical seal is made between the dispensing container and the receiving receptacle.

Figure 2:
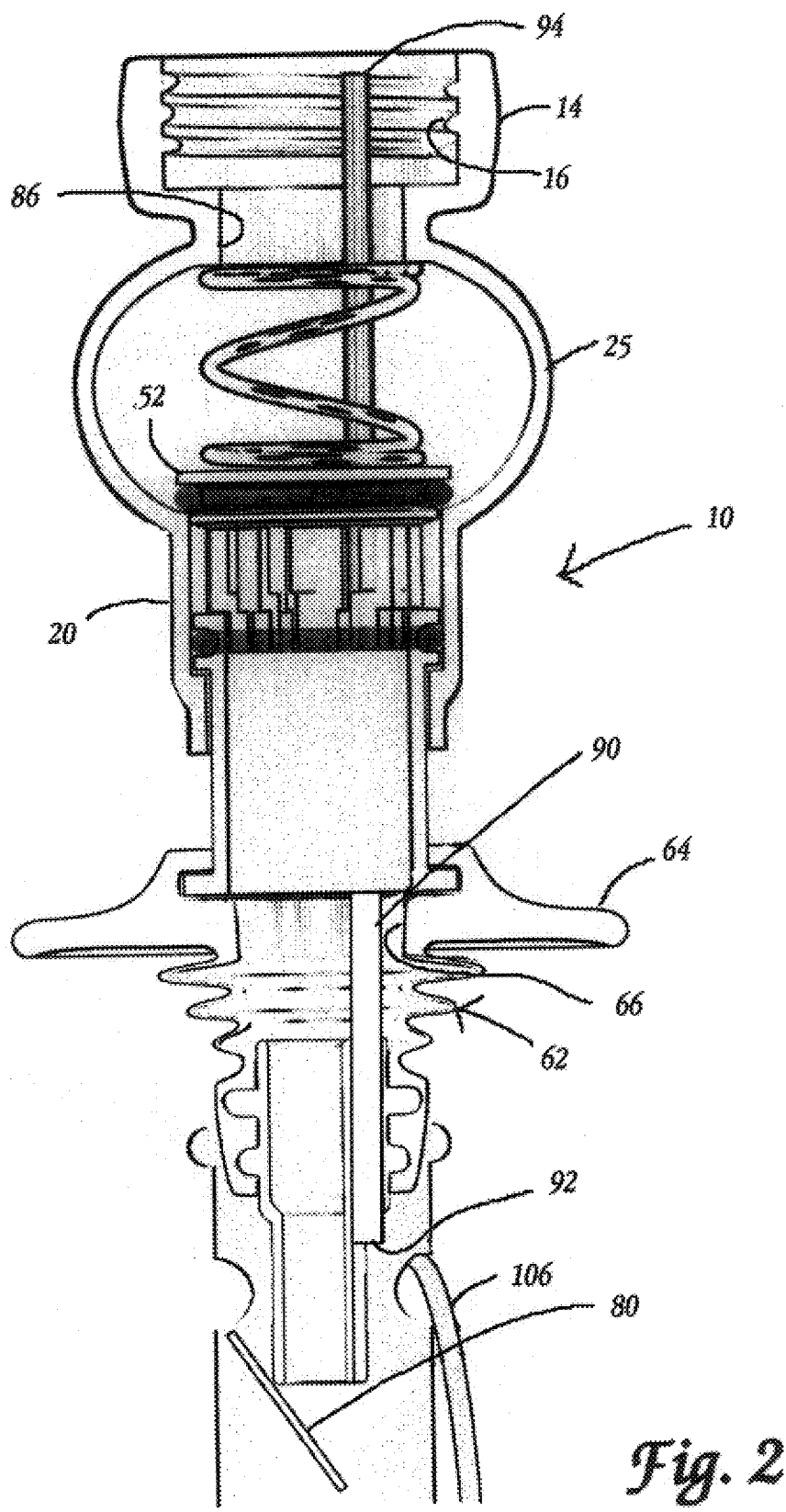
FIG. 2 is a sectional view, similar to FIG. 3, showing the initial contact and pre-dispensing mode for the valve mechanism of this invention.
Figure 3:
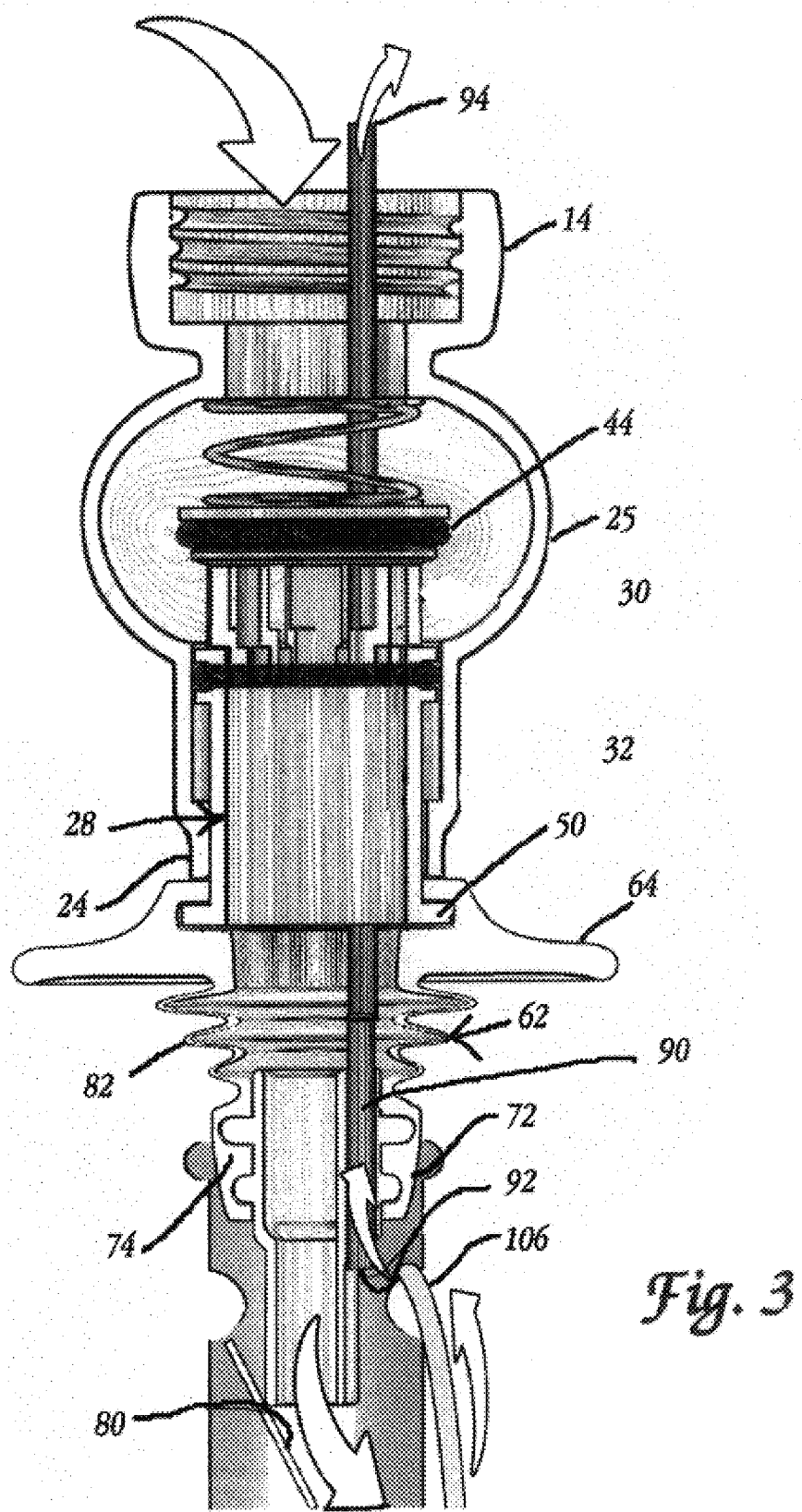
FIG. 3 is a sectional view, similar to FIGS. 1 and 2, showing the spring compressed and fluid dispensing mode for the valve mechanism hereof.

To effect axial movement of the insert 22 is a compression spring 84 situated within the broadened portion 25. Specifically, the spring 84 extends between the cap portion 52 of the cage member 30 and the opening 86 of first end 14. FIG. 1 shows the spring 84 in the extended position urging the O-ring 44 against the lower portion of the broadened portion 25 to effect a seal, such as during a transporting mode for the container containing the valve assembly 10 hereof. FIG. 2 shows the initial contact for the valve assembly 10 with the pivotal valve 80, and the collapsed bellows member 62, where sealing contact with one of the bellows elements is effected with the receptacle opening, which, as illustrated in FIGS. 1, 2 and 3, shows the opening in a gas tank or fender well. By continuing the axial pressure on the valve assembly 10, the spring begins to compress with the insert 22 moving upward to expose the cage member 30 to allow the passage of fluid therethrough. The broader arrows in FIG. 3 indicate the flow of fluid through the valve assembly 10.

One important feature of this invention is its ability to transfer fluid without the typical "gurgling" sound resulting when escaping air from the receiving receptacle passes the incoming fluid. In other words, the incoming fluid must displace the air within the receptacle, while at the dispensing end air must replace the fluid leaving the container. In the present invention, an internal air transfer tube 90 is provided, see FIGS. 3 and 4. The air transfer tube 90, preferably flexible, connects first to the upper axial ring 55 of the valve assembly 10, with another tube section to the lower axial ring 55'. The lower end 92 is open to the exiting air from the receiving receptacle, while the upper end 94 may include a flexible tube 96 having an air return line float 98 at its distal end 100, see FIG. 4. By the use of the return line float 98 the distal end remains above the fluid level in the dispensing container 102. As the fluid is dispensed therefrom, air from the receiving receptacle 104 is forced therefrom, note the small direction arrow, through opening 106, thence through the air transfer tube 90 in the container 102. Finally, with the float 98 above the fluid level, particularly during storage of the container where a fuel is the fluid, the float 98 also act as a vent to relieve gas vapors when the temperature rises, such as during the hot days of summer.

A common feature of containers that may be used for transporting fluids, particularly fuel, is an air relief valve 108, as known in the art, which is in the opened position when initially filling the container 102.

It is recognized that changes, variations and modifications may be made to the valve assembly of this invention, particularly by those skilled in the art, without departing from the spirit and scope thereof. Accordingly, no limitation is intended to be imposed on the invention except as set forth in the appended claims.

What is claimed is:

1. In combination with a portable container for transporting a fluid, and for rapidly and safely transferring said fluid to a receptacle, said container consisting of a closed fluid chamber having a top wall, bottom wall and side walls extending therebetween, and includes means to fill and to transfer fluid from said chamber, an improved, spring biased valve assembly for rapidly and safely transferring said fluid from said chamber, said valve assembly comprising a generally circular, hollow housing open at its respective ends, with an enlarged midsection between a first end and a second end, an axially slidable, fluid sealing insert within said first end, where said insert is initially held in a closed and fluid transporting position by a coil spring, said insert further including a circular base for abutting said coil spring, where said annular base has a diameter greater than the diameter of said first end, and a sealing O-ring, such that in said closed and fluid transporting position the periphery of said O-ring abuts said enlarged midsection at its junction with said first end.

2. The combination according to claim 1, wherein said insert of said improved valve assembly comprises two matable members, a first said matable member consisting of a cylindrical section having a flared end that extends beyond said first end of said circular housing, and a second matable member for positioning within said first matable member, said second matable member consisting of a cage member having plural radial members extending downwardly from said circular base.

3. The combination according to claim 2, wherein said first end of said circular housing includes an inwardly directed intermediate flange to provide a stop for said insert slidable within said first end of said housing.

4. The combination according to claim 3, wherein said first matable member mounts at least one external, elastomeric sealing ring to provide a fluid seal between said insert and said first end of said housing.

5. The combination according to claim 4, wherein said elastomeric sealing ring comprises a pair of O-rings mounted within spaced apart annular grooves along the outer wall of said first matable member.

6. The combination according to claim 1, wherein said second end of said housing includes an inwardly directed, annular flange to support said coil spring.

7. The combination according to claim 1, wherein the opposite end of said first matable member includes an outwardly extending flange for snap engaging a bellows member having an axial opening.

8. The combination according to claim 7, wherein said bellows member is fabricated of an elastomeric material, and includes a thin walled, flexible portion that is collapsible upon the application of axial pressure to said valve assembly.

9. The combination according to claim 8, wherein a first end of said bellows member snap engages said outwardly extending flange, and a second end includes a protruding inflexible insert.

10. The combination according to claim 9, including an internal air transfer tube for the relief of air from the dispensing portable container.

11. The combination according to claim 10, including a flexible tube attached to said air transfer tube and of a length sufficient to reach the bottom of said portable container, where a free end of said flexible tube mounts an air return line float to retain said free end above the level of fluid in said portable container in a fluid dispensing mode.

12. The combination according to claim 8, wherein said flexible portion comprises plural concentric sections having different diameters.

* * * * *